United States Patent [19]
Goetz

[11] Patent Number: 5,913,537
[45] Date of Patent: Jun. 22, 1999

[54] HYBRID INFLATOR INCLUDING NON-METALLIC NITROGEN CONTAINING IGNITABLE MATERIAL

[75] Inventor: George W. Goetz, Rochester Hills, Mich.

[73] Assignee: TRW Vehicle Safety Systems Inc., Lyndhurst, Ohio

[21] Appl. No.: 08/489,032

[22] Filed: Jun. 9, 1995

[51] Int. Cl.$^6$ .................................................. B60R 21/26
[52] U.S. Cl. .......................................... 280/741; 102/531
[58] Field of Search .................................. 280/737, 741, 280/736, 740, 742; 222/3, 5; 102/530, 531; 422/164, 165, 166

[56] References Cited

U.S. PATENT DOCUMENTS

| | | | |
|---|---|---|---|
| 3,655,217 | 4/1972 | Johnson | 280/737 |
| 3,663,036 | 5/1972 | Johnson . | |
| 3,715,131 | 2/1973 | Hurley et al. . | |
| 3,723,205 | 3/1973 | Scheffee | 280/741 |
| 3,756,621 | 9/1973 | Lewis et al. . | |
| 3,758,131 | 9/1973 | Stephenson et al. . | |
| 3,788,667 | 1/1974 | Vancil . | |
| 3,814,694 | 6/1974 | Klager et al. | 280/741 |
| 3,905,515 | 9/1975 | Allemann | 222/3 |
| 3,910,595 | 10/1975 | Katter et al. . | |
| 3,966,226 | 6/1976 | Roth | 280/737 |
| 3,985,375 | 10/1976 | Lewis et al. | 280/737 |
| 4,018,457 | 4/1977 | Marlow | 280/737 |
| 4,981,534 | 1/1991 | Scheffe | 280/741 |
| 5,022,674 | 6/1991 | Frantom et al. | 280/737 |
| 5,062,365 | 11/1991 | Canterberry . | |
| 5,125,684 | 6/1992 | Cartwright | 280/736 |
| 5,131,680 | 7/1992 | Coultas et al. | 280/737 |
| 5,160,163 | 11/1992 | Castagner et al. . | |
| 5,263,740 | 11/1993 | Frey et al. | 280/737 |
| 5,280,672 | 1/1994 | Hochstein . | |
| 5,388,859 | 2/1995 | Fischer et al. | 280/737 |
| 5,460,406 | 10/1995 | Faigle | 280/737 |
| 5,468,015 | 11/1995 | Goetz | 280/742 |
| 5,507,891 | 4/1996 | Zeigler . | |
| 5,553,889 | 9/1996 | Hamilton et al. | 280/737 |
| 5,589,141 | 12/1996 | Sides et al. | 280/741 |
| 5,602,361 | 2/1997 | Hamilton et al. | 280/741 |
| 5,616,883 | 4/1997 | Hamilton . | |
| 5,627,337 | 5/1997 | Hamilton et al. . | |
| 5,630,618 | 5/1997 | Hamilton et al. . | |

FOREIGN PATENT DOCUMENTS

| | | |
|---|---|---|
| 0591119 | 4/1994 | European Pat. Off. . |
| 616927 | 9/1994 | European Pat. Off. ............... 280/736 |
| 0673809 | 9/1995 | European Pat. Off. . |
| 50-112939 | 9/1975 | Japan . |

OTHER PUBLICATIONS

An article entitled "Technology of Polymer Compounds and Energetic Materials", 21$^{st}$ International Annual Conference of ICT 1990, pp. 44–1 to 44–6.

*Primary Examiner*—Peter C. English
*Attorney, Agent, or Firm*—Tarolli, Sundheim, Covell, Tummino & Szabo

[57] ABSTRACT

An apparatus (10) for inflating an air bag includes a container (12) having a chamber (16) for holding a noble gas and an oxidizer gas under pressure. A body (20) of an ignitable material comprising a non-metallic nitrogen containing compound is disposed in the container (12). Upon ignition of the body (20) of ignitable material, combustion products, including heat, are generated. The combustion products then mix with, and heat, the noble gas and the oxidizer gas. The body (20) of ignitable material undergoes further combustion upon exposure to the oxidizer gas to yield an inflation fluid comprising the noble gas and any unreacted oxidizer gas. The inflation fluid flows from the container (12) through openings (28) in the end wall of the container (12) into a diffuser (36). The inflation fluid exits the diffuser (36) and inflates an air bag connected with the diffuser (36).

9 Claims, 3 Drawing Sheets

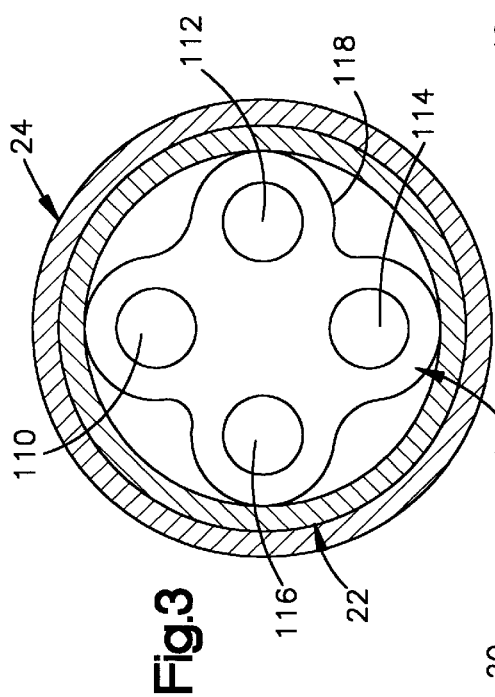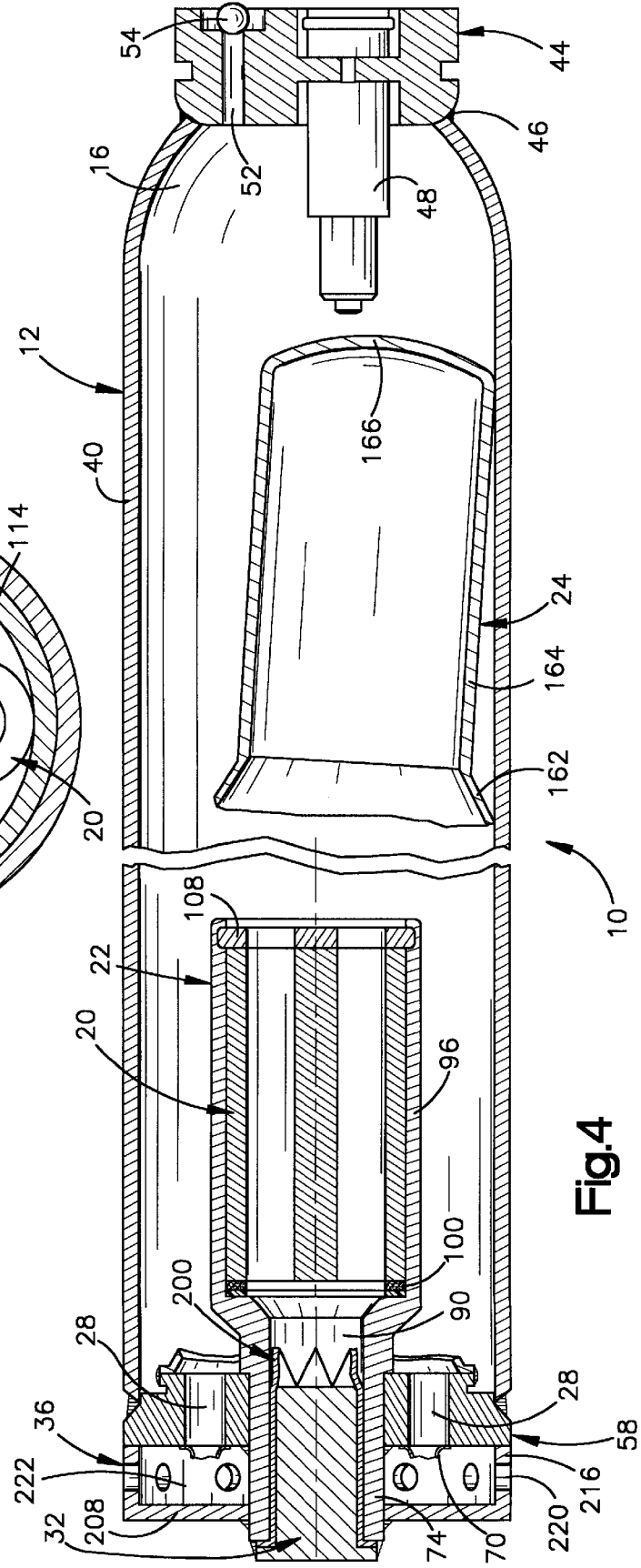

HYBRID INFLATOR INCLUDING NON-METALLIC NITROGEN CONTAINING IGNITABLE MATERIAL

BACKGROUND OF THE INVENTION

The present invention relates to an apparatus for use in inflating a vehicle occupant restraint, and particularly relates to an inflator for providing inflation fluid for inflating an air bag.

A known inflator provides inflation fluid for inflating an air bag. The known inflator includes an aluminum housing defining a chamber. The chamber contains air stored under pressure and nitrocellulose for, when ignited, providing heat for increasing the pressure of the stored air. The known inflator also includes an igniter which is activated to ignite the nitrocellulose.

SUMMARY OF THE INVENTION

In accordance with the present invention, an inflator for inflating a vehicle occupant restraint, such as an air bag, includes a container having a supply of stored gases. The supply of stored gases comprises at least one noble gas and at least one oxidizer gas. The inflator also includes a quantity of an ignitable non-metallic nitrogen containing compound. The non-metallic nitrogen containing compound burns in the presence of the oxidizer gas, and generates combustion products, including heat, to increase the pressure of at least the stored noble gas. The inflator further includes an igniter for igniting the quantity of non-metallic nitrogen containing compound. An inflation fluid comprising the heated noble gas, and any unreacted oxidizer gas flows into the vehicle occupant restraint.

Also in accordance with the present invention, an inflator for inflating a vehicle occupant restraint, such as an air bag, includes a container for holding a gas. The gas in the container includes an inert gas and oxygen. A quantity of ignitable cyclotrimethylenetrinitramine is also located in the container. The cyclotrimethylenetrinitramine burns in the presence of the oxygen, and generates combustion products, including heat, for heating the inert gas. The inflator also includes an igniter means for igniting the quantity of cyclotrimethylenetrinitramine, and means to direct the heated inert gas into the vehicle occupant restraint.

BRIEF DESCRIPTION OF THE DRAWINGS

The foregoing and other objects and features of the present invention will become more apparent to one skilled in the art upon a consideration of the following description of the invention and the accompanying drawings in which:

FIG. 3 is a sectional view, taken approximately along the line 3—3 of FIG. 2; and FIG. 4 is a sectional view, generally similar to FIG. 1, illustrating the relationship between parts of the inflator of FIG. 1 after the inflator has been actuated.

DESCRIPTION OF EMBODIMENTS OF THE INVENTION

Figure 1:
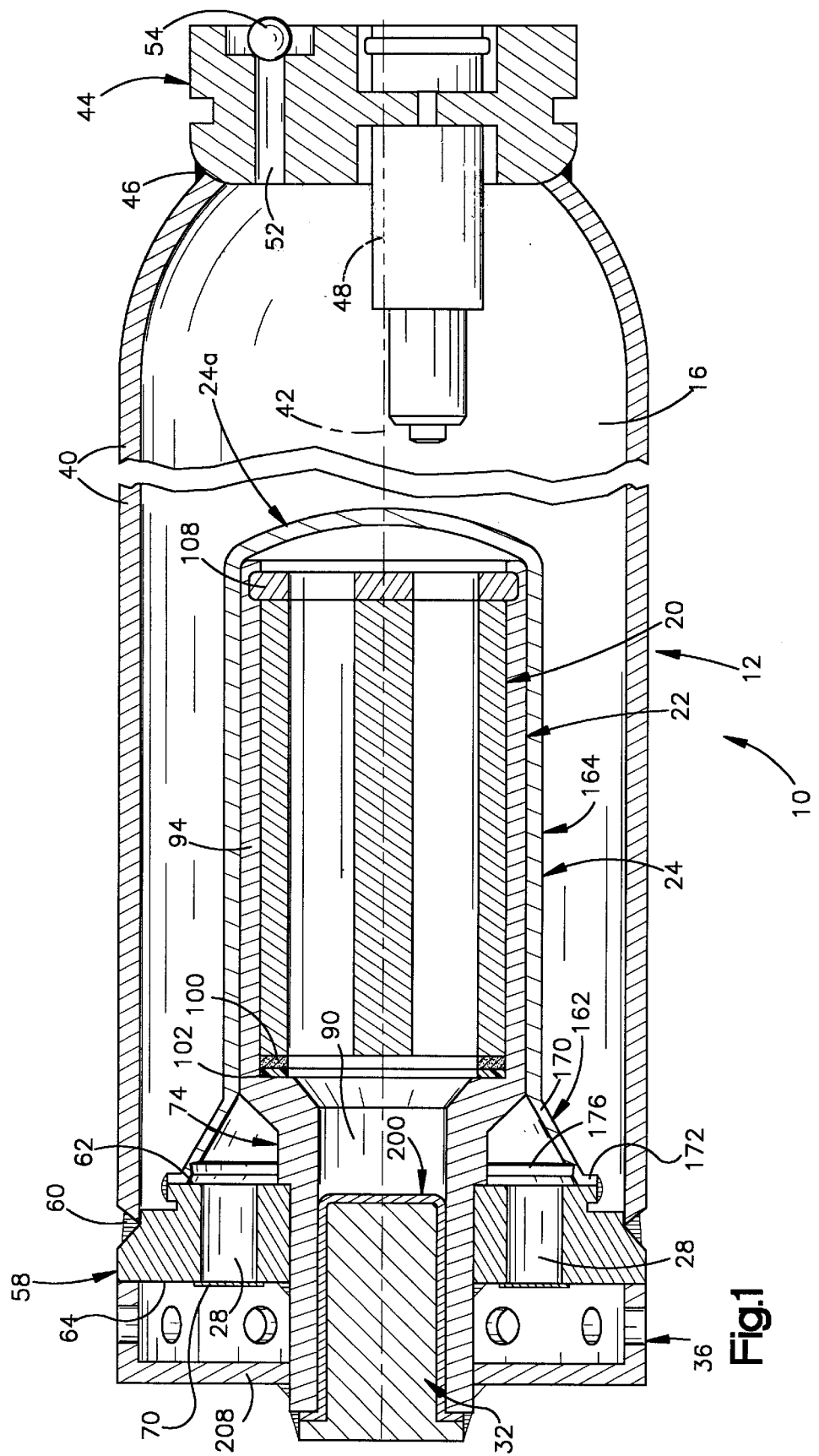
FIG. 1 is a sectional view of an inflator constructed in accordance with the present invention.

An inflator 10 (FIG. 1) provides inflation fluid for inflating a vehicle occupant restraint, such as an air bag (not shown). The inflator 10 includes a generally cylindrical container 12 having a chamber 16 which holds a supply of stored gases.

A cup shaped closure member 24 blocks gas flow from the chamber 16 through a plurality of discharge passages 28. The cup shaped closure member 24 has a closed end 24a and an opposite open end. A body 20 of ignitable material is disposed in a housing 22. The body 20 of ignitable material and the housing 22 extend into the cup shaped closure member 24. An igniter 32 is also disposed within the housing 22.

When an air bag is to be inflated to help restrain movement of an occupant of a vehicle, the igniter 32 is activated to ignite the body 20 of ignitable material. Ignition of the body 20 of the ignitable material creates heat and combustion products which apply pressure against the closed end 24a of the closure member 24. The pressure applied to the closed end 24a of the closure member 24 breaks the closure member and moves it away from the discharge passages 28, as shown in FIG. 4.

The container 12 (FIG. 1) includes a cylindrical one-piece steel side wall 40. The side wall 40 has a longitudinal central axis which is coincident with a longitudinal central axis 42 of the container 12. The container 12 also includes a one-piece circular steel end wall 44 which is connected with the right end (as viewed in FIG. 1) of the side wall 40 at an annular weld 46. A pressure sensor 48 is mounted on the end wall 44 to sense the fluid pressure in the chamber 16. A fill passage 52 is formed in the end wall 44 and is closed by a steel ball 54 which is welded in place. The circular end wall 44 is coaxial with the side wall 40. The central axis 42 of the container 12 extends through the center of the end wall 44.

A circular steel end wall 58 is connected with the left end (as viewed in FIG. 1) of the side wall 40 by an annular weld 60. The left end wall 58 is disposed in a coaxial relationship with the right end wall 44 and the side wall 40 of the container 12. The end wall 58 has parallel inner and outer, radially extending side surfaces 62 and 64. Inner side surface 62 is presented toward the interior of the container 12, while the outer side surface 64 is presented away from the interior of the container. The weld 60 connects the left end (as viewed in FIG. 1) of the side wall 40 with the end wall 58 at a location intermediate the inner and outer side surfaces 62 and 64.

The discharge passages 28 are formed in the end wall 58. The discharge passages 28 have cylindrical configurations with central axes which extend parallel to the central axis 42 of the container 12. The discharge passages 28 are arranged in an annular array about the central axis 42 of the container 12. Although only two discharge passages 28 are shown in FIG. 1, it should be understood that there are a plurality of discharge passages formed in the end wall 58.

An annular metal foil seal 70 is secured by a suitable adhesive to the outer side surface 64 of the end wall 58 across the ends of discharge passages 28. The seal 70 blocks the conduction of moisture from the environment around the inflator assembly 10 through the discharge passages 28.

The housing 22 encloses the body 20 of ignitable material. The housing 22 has a central axis which is coincident with the central axis 42 of the container 12. The housing 22 includes a tubular base section 74 (FIG. 2) which extends through the end wall 58 of the container 12. The base section 74 is generally circular in transverse section. An annular, radially extending shoulder 76 on the outer surface of the base section 74 abuts the inner side surface 62 of the end wall 58. An annular weld 80 connects the base section 74 of the housing 22 with the outer side surface 64 of the end wall 58.

Figure 2:
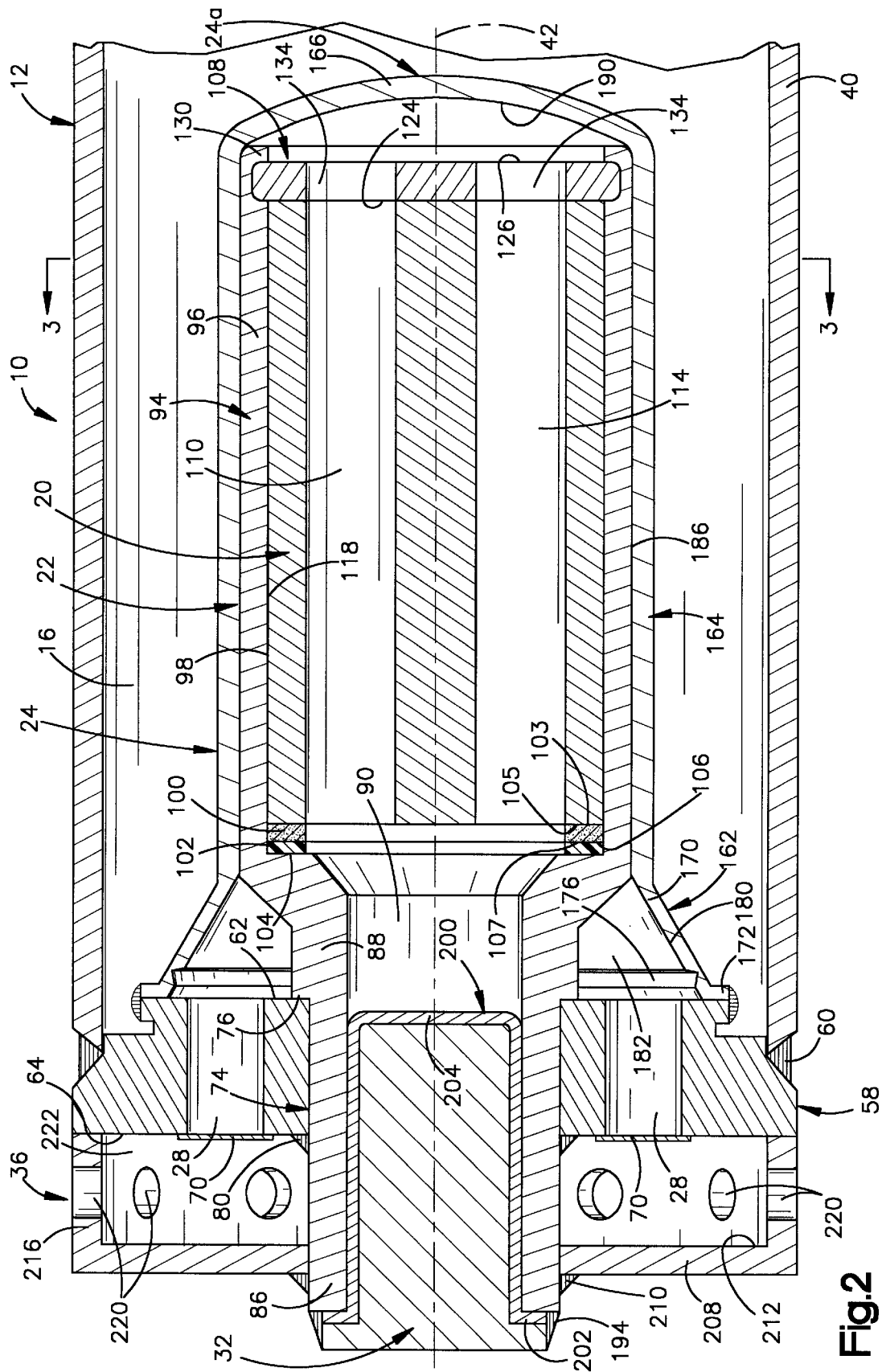
FIG. 2 is an enlarged fragmentary sectional view of a portion of the inflator of FIG. 1.

The base section 74 of the housing 22 has a cylindrical outer end portion 86 which extends axially outward, that is, away from the interior of the container 12 and toward the left as viewed in FIG. 2, from the end wall 58. An inner end portion 88 of the base section 74 extends axially inward, that is, toward the interior of the container 12 and to the right as viewed in FIG. 2, from the end wall 58. A cylindrical passage 90 extends through the center of the base section 74. The igniter 32 is located in the passage 90.

A tubular main section 94 of the housing 22 is formed as one piece with the base section 74. The main section 94 of the housing 22 includes a cylindrical side wall 96. The side wall 96 and base section 74 have central axes which are coincident with the central axis 42 of the container 12. The cylindrical side wall 96 has a relatively large outer diameter. Therefore, the base section 74 flares radially outward to the side wall 96 of the main section 94 of the housing 22.

The main section 94 of the housing 22 has a cylindrical housing chamber 98 (FIG. 2). The housing chamber 98 has a central axis which is coincident with the central axis 42 of the container 12. The housing chamber 98 contains an annular ring 100 of auto-ignition material adjacent to one end of the body 20 of the ignitable material. An annular cushioning ring 102 is disposed between the ring 100 of auto-ignition material and an annular end surface or shoulder 104 on the housing 22.

The cushioning ring 102 rests against the radially extending shoulder 104, which is formed on the axially inner end of the base section 74 of the housing 22. The cushioning ring 102 has a central axis which is coincident with the central axis 42 of the container 12. The cushioning ring 102 is formed of a suitable polymeric material, such as silicone.

The annular ring 100 of auto-ignition material is disposed in a coaxial relationship with the cushioning ring 102 and the body 20 of ignitable material. The ring 100 of auto-ignition material is preferably a stabilized nitrocellulose composition, such as IMR 4895 which is commercially available from E.I. DuPont de Nemours & Co. The auto-ignition material ignites at a temperature of about 350° F. A flat annular side surface 103 of the ring 100 of auto-ignition material is disposed in abutting engagement with a flat end surface 105 on the body 20 of ignitable material. Similarly, a parallel flat annular side surface 106 on the ring 100 of auto-ignition material is disposed in abutting engagement with a flat annular side surface 107 on the cushioning ring 102.

The body 20 of ignitable material may have a multi-lobe cross-sectional configuration (FIG. 3) and extends from the ring 100 of auto-ignition material (FIG. 2) through the housing chamber 98 to a circular end wall 108 of the housing 22. A plurality of straight cylindrical passages 110, 112, 114, and 116 (FIG. 3) extend between axially opposite ends of the body 20 of ignitable material (FIG. 2). The passages 110, 112, 114 and 116 have longitudinal central axes which are parallel to the central axis 42 of the container 12.

The body 20 of ignitable material has a continuous, curved outer side surface 118 (FIG. 3) which defines and extends around four lobes through which the passages 110, 112, 114 and 116 extend. Although the body 20 of ignitable material has been illustrated in FIG. 3 as having four lobes and passages 110, 112, 114 and 116, it is contemplated that the body 20 of ignitable material could be formed with a different configuration if desired. For instance, the body 20 of ignitable material may be in the form of a cylinder or plurality of cylinders.

The end wall 108 (FIG. 2) of the housing 22 is a powdered metal part, but may be made from an alloy steel. The end wall 108 has a flat circular, radially extending inner side surface 124 which abuttingly engages one end of the body 20 of ignitable material (FIG. 2). The end wall 108 also has a flat circular, radially extending outer side surface 126 which extends parallel to the inner side surface 124. An annular crimp or rim 130 at the right end (as viewed in FIG. 2) of the cylindrical housing side wall 96 engages the outer side surface 126 of the end wall 108 to hold the end wall in place in the housing 22.

A plurality of passages are provided in the end wall 108 to conduct combustion products, including heat, which are created upon ignition of the body 20 of ignitable material. Specifically, the end wall 108 has four cylindrical main passages 134 (two of which are shown in FIG. 2), which extend through the end wall 108 and are aligned with the passages 110, 112, 114 and 116 (FIG. 3) in the body 20 of ignitable material. The passages 134 through the end wall 108 conduct combustion products from the passages 110, 112, 114 and 116 (FIG. 3) in the body 20 of ignitable material.

The closure member 24 (FIG. 2) blocks the discharge passages 28 and encloses the main section 94 of the housing 22. The closure member 24, as discussed above, has a generally cup shaped configuration and is formed as one piece of a suitable material, such as low carbon steel or annealed stainless steel. The closure member 24 has a central axis which is coincident with the central axis 42 of the container 12.

The closure member 24 includes a skirt section 162 which is connected to the flat circular inner side surface 62 of the end wall 58 (FIG. 2). The closure member 24 has a cylindrical side wall 164 which is connected to and is coaxial with the skirt section 162. The side wall 164 encloses the main section 94 of the housing 22 and the body 20 of ignitable material. An imperforate circular end wall 166 of the closure member 24 is connected with the right end (as viewed in FIG. 2) portion of the side wall 164 and closes the end 24a of the cup shaped closure member. The end wall 166 extends across the right end (as viewed in FIG. 2) of the housing 22. The end wall 166 has an inner side surface 190.

The skirt section 162 has a side wall 170 with a configuration which is a frustrum of a cone. An annular flange 172 extends radially outward from the left (as viewed in FIG. 2) end of the side wall 170 and is welded to the end wall 58. The annular flange 172 circumscribes the annular array of inlet openings to the discharge passages 28. The annular flange 172 is disposed in a coaxial relationship with the annular array of discharge passages 28.

The side wall 170 of the skirt section 162 extends from the main section 94 of the housing 22 to the inner side surface 62 of the end wall 58. In the embodiment of the invention illustrated in FIG. 2, the cylindrical main section 94 of the housing 22 has a outer surface which is located radially inward of the longitudinal axes of the individual discharge passages 28. Therefore, the skirt section 162 flares axially away and radially outward from the main section 94 of the housing 22 toward the end wall 58. However, it is contemplated that the main section 94 of the housing 22 could be formed with a somewhat larger diameter so that the skirt section 162 could be cylindrical and still circumscribe the annular array of discharge passages 28.

An annular frangible section 176 (FIG. 2) of reduced thickness is formed in the skirt section 162. The frangible section 176 is breakable under the influence of tension forces transmitted from the end wall 166 of the cup shaped closure member 24 upon ignition of the body 20 of ignitable material. The frangible section 176 is coaxial with the central axis 42 of the container 12 and extends around the base section 74 of the housing 22.

The skirt section 162 (FIG. 2) has an inner side surface 180 which cooperates with the inner side surface 62 on the end wall 58 and an outer side surface of the base section 74 to form an annular manifold chamber 182. The manifold chamber 182 extends around the base section 74 of the housing 22 and has a central axis which is coincident with the central axis 42 of the container 12. The discharge passages 28 in the end wall 58 have circular inner ends which open to the manifold chamber 182.

Prior to breaking of the frangible section 176 of the skirt section 162, the manifold chamber 182 is isolated from the supply of stored gas in the chamber 16. Thus, the fluid pressure in the manifold chamber 182, prior to breaking of the frangible section 176, will be approximately atmospheric pressure.

The tubular side wall 164 (FIG. 2) of the closure member 24 has a cylindrical inner side surface 186 which is disposed in engagement with a cylindrical outer side surface of the main section 94 of the housing 22. The inner side surface 186 of the side wall 164 is freely slidable along the outside of the housing 22 under the influence of gas pressure applied against the end wall 166 after ignition of the body 20 of ignitable material and breaking of the frangible section 176 of the closure member 24.

The igniter 32, which is located in the passage 90 (FIG. 2) extending through the base section 74 of the housing 22, has a cylindrical configuration. The igniter 32 is axially aligned with the left end (as viewed in FIG. 2) of the body 20 of ignitable material. An outer metal casing of the igniter 32 is connected with the outer or left (as viewed in FIG. 2) end of the base section 74 of the housing 22 by an annular weld 194. The igniter 32 includes a pyrotechnic charge which may be zirconium potassium perchlorate or $BKNO_3$ or, if desired, a different chemical composition.

The igniter 32 is connected with a sensor assembly (not shown) which detects vehicle deceleration. If the sensor assembly detects vehicle deceleration of a magnitude requiring actuation of an air bag to protect a vehicle occupant, the sensor assembly completes an electrical circuit with an energy source. Completing the electrical circuit actuates the igniter assembly 32 to effect ignition of the body 20 of ignitable material.

A one-piece seal cup 200 (FIG. 2) is disposed in the passage 90 and receives the igniter 32 to block the conduction of moisture to the body 20 of ignitable material from the environment around the inflator assembly 10. The seal cup is formed as a single piece of metal and has a thickness of between 0.20 and 0.30 millimeters. The seal cup 200 has an annular flange 202 which is connected with the outer or left (as viewed in FIG. 2) end of the base section 74 by the weld 194. A plurality of score lines (not shown) extend diametrically across the right (as viewed in FIG. 2) end wall 204 of the seal cup 200. The score lines have a depth of approximately 0.10 to 0.05 millimeters. The score lines weaken the seal cup 200 so that it is easily ruptured upon activation of the igniter 32.

A diffuser 36 is formed from a single piece of steel and has a circular end wall 208 (FIG. 2). The diffuser end wall 208 is connected to the base section 74 of the housing 22 by an annular weld 210 and extends radially outward from the outer end portion 86 of the base section. The end wall 208 of the diffuser 36 has a central axis which is coincident with the central axis 42 of the container 12. A flat circular, radially extending inner side surface 212 on the end wall 208 extends parallel to and is spaced from the flat circular outer side surface 64 on the end wall 58.

A cylindrical side wall 216 (FIG. 2) of the diffuser 36 is formed as one piece with the end wall 208 and extends axially from the outer periphery of the end wall. The outer diameter of the cylindrical side wall 216 of the diffuser 36 is the same as the diameter of the outer side surface 64 on the end wall 58. The cylindrical side wall 216 of the diffuser 36 is welded to the outer side surface 64 of the container end wall 58.

An annular array of radially extending cylindrical passages 220 is formed in the side wall 216 of the diffuser 36. The combined flow area of the passages 220 is larger than the combined flow area of the passages 28 in the end wall 58. The radially extending passages 220 are connected in fluid communication with an annular diffuser chamber 222 which is defined by the diffuser 36, the container end wall 58, and the base section 74 of the housing 22. The diffuser chamber 222 extends around the outer end portion 86 of the base section 74 of the housing 22. The diffuser passages 220 are also connected in fluid communication with the inside of an air bag (not shown).

The housing 22, closure member 24, igniter 32 and diffuser 36 are all connected with the end wall 58 of the container 12. By connecting the housing 22, closure member 24 and diffuser 36 to the end wall 58, these components of the inflator assembly 10 can be mounted as a unit on the side wall 40 of the container. The igniter 32 can be connected to the housing 22 after the end wall 58, housing 22, closure member 24 and diffuser 36 have been connected as a unit with the side wall 40 of the container 12.

The body 20 of ignitable material contains a quantity of a non-metallic nitrogen containing compound. The quantity of the non-metallic nitrogen containing compound is a material capable of undergoing rapid and substantially complete oxidation. The preferred non-metallic nitrogen containing compound is a smokeless powder such as is used in the manufacture of explosives and ammunition. The non-metallic nitrogen containing compound may be a material utilized in a low vulnerability ammunition ("LOVA").

The non-metallic nitrogen containing compound is preferably a material selected from the group consisting of nitroguanidine, triaminoguanidine nitrate, ethylene dinitramine, ethylenediamine dinitrate, 1, 3, 3-trinitroazetidine, cyclotrimethylenetrinitramine, cyclotetramethylenetetranitramine, trinitrotoluene, 2, 4, 6-trinitrophenylmethylnitramine and pentaerythritol tetranitrate and mixtures thereof. Preferably, the non-metallic nitrogen containing compound is cyclotrimethylenetrinitramine (RDX). A second preferred non-metallic nitrogen containing compound is cyclotetramethylenetetranitramine (HMX). The non-metallic nitrogen containing compound is a solid at 20° C.

The body 20 of ignitable material also includes a binder material which is mixed with the non-metallic nitrogen containing compound to provide an intimate mixture. The non-metallic nitrogen containing compound is mixed with the binder material to obtain a moldable or extrudable plastic mass. Suitable binder materials include materials such as polyether polyester compounds. A particularly useful polyether polyester binder material for use with cyclotrimethylene-trinitramine is a Hytrel™ rubber from E.I. DuPont de Nemours & Co. Other binder materials which may be used with the quantity of the non-metallic nitrogen containing compound include cellulose based binders. Suitable cellulose based binders include, for instance, cellulose acetate, triethylacetylcitrate and cellulose acetate butyrate. The proportion of the non-metallic nitrogen containing compound to the binder, by weight, is preferably from about 20:1 to about 5:1.

The non-metallic nitrogen containing compound may also be mixed with a plasticizer in addition to the binder in the intimate mixture. Any plasticizer typically employed in the manufacture of low vulnerability ammunition may be used. When a plasticizer is used, it is desirable to maintain a weight ratio of the non-metallic nitrogen containing compound to the plasticizer of about 20:1 to about 5:1.

The non-metallic nitrogen containing compound mixed with a binder and a plasticizer is preferably extruded to form the body 20 of ignitable material. A preferred weight ratio of the non-metallic nitrogen containing compound to the binder and to the plasticizer is about 8:1:1.

The amount of the non-metallic nitrogen containing compound in the body 20 of ignitable material is about 10 to about 35 grams, preferably about 13 to about 20 grams. The non-metallic nitrogen containing compound is sufficiently effective in generating combustion products that it is the only fuel needed.

The supply of stored gases in the chamber 16 comprises a mixture of one or more noble gases and at least one oxidizer gas. The noble gases are inert gases. The preferred noble gases are helium and argon, and mixtures thereof. Either argon or helium may be used alone. Also, a mixture of argon and helium in any proportions may be employed. A preferred mixture is argon and helium in a volume ratio of about 50:1 to about 10:1.

The oxidizer gas is any gas capable of oxidizing the non-metallic nitrogen containing compound to produce combustion products. Preferably, the oxidizer gas is oxygen. The oxygen is preferably the only gas other than the noble gas present in the supply of stored gases. When utilizing argon as the noble gas, the volume ratio of oxygen to argon is typically about 1:3 to about 1:8 respectively. The gas is stored in the chamber 16 at a pressure of approximately 2,000 to 3,500 psi.

Upon the occurrence of sudden vehicle deceleration of a magnitude requiring air bag inflation, a deceleration sensor (not shown) completes an electrical circuit to activate the igniter 32 (FIG. 2) in a known manner. This results in ignition of a pyrotechnic charge in the igniter 32. Burning of the pyrotechnic charge in the igniter 32 generates gas which ruptures the relatively thin seal cup 200.

Rupturing the seal cup 200 enables hot gases to flow through the passage 90 in the base section 74 of the housing 22. The hot gases engage the left end portion (as viewed in FIG. 2) of the body 20 of ignitable material. The hot gases ignite the body 20 of ignitable material to produce combustion products, including heat.

Upon ignition of the body 20 of ignitable material, the combustion products are conducted through the end wall 108 of the housing 22. The combustion products apply pressure against the end wall 166 of the closure member 24. The pressure applied against the end wall 166 of the closure member 24 results in the transmission of tensile forces through the side wall 164 of the closure member to the skirt section 162 of the closure member. These tensile forces are effective to break the frangible section 176 (FIG. 2) of the skirt section 162.

Upon breaking of the frangible section 176 of the skirt section 162, the pressure applied by the combustion products from the burning body 20 of ignitable material moves the closure member 24 away from the end wall 58 of the container 12 toward the opposite end wall 44 (see FIG. 4). Thus, the pressure applied against the end wall 166 (FIG. 2) of the closure member 24 moves the closure member toward the right (as viewed in FIG. 2). This movement of the closure member 24 is initially guided by sliding movement of the side wall 164 of the closure member along the side wall 96 of the housing 22. The closure member 24 then separates from the housing 22 and comes to rest adjacent to the end wall 44 of the container 12 (FIG. 4).

As soon as the frangible section 176 in the skirt section 162 (FIG. 2) breaks, the combustion products from the body 20 of ignitable material mix with and heat the stored gases in the chamber 16. Also the oxidizer gas in the chamber 16 contacts the combustion products of the fuel rich ignitable material 20 in chamber 16 near the region of skirt section 162 in FIG. 4, generating extra heat as the combustion products of the ignitable material 20 mix with the oxidizer gas. The reaction of the oxidizer gas and the combustion products of the ignitable material 20 complete the reaction to form carbon dioxide and water. The heat generated by the original combustion, and the heat generated by the combustion of the remaining uncombusted material of the body 20 of ignitable material heats the supply of stored gases in the chamber 16, including the noble gas. An air bag inflation fluid comprising the heated noble gas and any remaining oxidizer gas flows into the annular manifold chamber 182. The pressure from the inflation fluid transmitted from the manifold chamber 182 through the discharge passages 28 ruptures the seal 70 (FIGS. 2 and 4). The inflation fluid then flows from the chamber 16 through the discharge openings 28 into the diffuser chamber 222.

When the inflation fluid enters the diffuser chamber 222, it impinges against the end wall 208 of the diffuser 36. The end wall 208 of the diffuser 36 directs the inflation fluid flow radially outward toward the openings 220 in the side wall 216 of diffuser 36. The inflation fluid flows through the openings 220 to the air bag. The air bag is thus inflated to the desired volume by the inflation fluid.

In FIG. 4 of the drawings, the igniter 32, the ring 100 of auto-ignition material, and the body 20 of ignitable material are illustrated in their condition prior to actuation of the inflator assembly 10. However, it should be understood that the igniter 32 is destroyed, and the ring 100 of auto-ignition material and body 20 of ignitable material are consumed during actuation of the inflator assembly 10.

An advantage to using the quantity of non-metallic nitrogen containing compound to generate heat is that metallic by-products are not produced. The combustion products produced by the ignition of the non-metallic nitrogen containing compound are relatively smokeless. Also, the noble gases have relatively low specific heats. Thus for a given quantity of the non-metallic nitrogen containing compound, a relatively high pressure change may be obtained when using a noble gas. The noble gases are also non-reactive when heated by the ignited non-metallic nitrogen containing compound.

From the above description of the invention, those skilled in the art will perceive improvements, changes and modifications. Such improvements, changes and modifications within the skill of the art are intended to be covered by the appended claims.

Having described the invention, the following is claimed:

1. An apparatus for use in inflating a vehicle occupant restraint, said apparatus comprising:

a container for holding a supply of gas;

a gas in said container, said gas comprising an inert gas and an oxidizer gas;

a quantity of a non-metallic nitrogen containing compound in said container which burns in the presence of said oxidizer gas which generates combustion products including heat for heating said inert gas, said oxidizer gas helping to support the combustion of said quantity of non-metallic nitrogen containing compound;

igniter means for igniting said quantity of non-metallic nitrogen containing compound; and means for directing said inert gas as heated by said combustion products toward the vehicle occupant restraint;

said quantity of non-metallic nitrogen containing compound being in an intimate mixture with a binder material comprising a polyether polyester polymer and said nitrogen containing compound is present in a respective weight ratio to said binder material of about 20:1 to about 5:1.

2. The apparatus of claim 1 wherein said quantity of non-metallic nitrogen containing compound is selected from the group consisting of nitroguanidine, triaminoguanidine nitrate, ethylene dinitramine, ethylenediamine dinitrate, 1, 3, 3-trinitroazetidine, cyclotrimethylenetrinitramine, cyclotetramethylenetetranitramine, trinitrotoluene, 2, 4, 6-trinitrophenylmethylnitramine, and pentaerythritol tetranitrate and mixtures thereof.

3. The apparatus of claim 2 wherein said inert gas is selected from the group consisting of helium and argon, and mixtures thereof.

4. The apparatus of claim 1 wherein said oxidizer gas in said container is oxygen.

5. The apparatus of claim 1 wherein said container is a steel container.

6. The apparatus of claim 1 wherein said inert gas is selected from the group consisting of helium and argon, and mixtures thereof.

7. The apparatus of claim 1 wherein said quantity of non-metallic nitrogen containing compound is cyclotrimethylenetrinitramine.

8. The apparatus of claim 1 wherein said inert gas consists of a mixture of argon and helium, and said oxidizer gas consists of oxygen.

9. The apparatus of claim 8 wherein said mixture of argon and helium is in a respective volume ratio of about 10:1 to about 50:1; and said oxygen is present in a respective volume ratio to said argon of about 1:3 to about 1:8.

* * * * *